United States Patent [19]

Arisawa et al.

[11] Patent Number: 4,584,072
[45] Date of Patent: Apr. 22, 1986

[54] PROCESS FOR SEPARATING AN ISOTOPE FROM A MIXTURE OF DIFFERENT ISOTOPES BY USING A SINGLE LASER BEAM

[75] Inventors: Takashi Arisawa; Yoichiro Maruyama; Youji Suzuki; Kazumi Iwamoto, all of Ibaraki, Japan

[73] Assignee: Japan Atomic Energy Research Institute, Tokyo, Japan

[21] Appl. No.: 473,131

[22] Filed: Mar. 7, 1983

[30] Foreign Application Priority Data

Mar. 10, 1982 [JP] Japan .................. 57-37483

[51] Int. Cl.⁴ .................. B01D 59/00; C01G 43/00
[52] U.S. Cl. .................. 204/157.22; 250/423 P; 423/3
[58] Field of Search .................. 423/3; 204/157.1 R; 250/423 P

[56] References Cited

U.S. PATENT DOCUMENTS

| | | | |
|---|---|---|---|
| 4,000,420 | 12/1976 | Harris | 250/423 P |
| 4,049,515 | 9/1977 | Robinson et al. | 204/157.1 R |
| 4,302,676 | 11/1981 | Levin et al. | 250/423 P |
| 4,350,577 | 9/1982 | Heller | 423/3 |
| 4,372,928 | 2/1983 | Chatelet et al. | 423/3 |
| 4,514,363 | 4/1985 | Dubrin | 423/3 |

FOREIGN PATENT DOCUMENTS 1017076 9/1977 Canada.
2854909 7/1979 Fed. Rep. of Germany.

OTHER PUBLICATIONS

Mainfray, "Resonance Effects in Multiphoton Ionization of Atoms" *Proc. Intl. Conf. Lasers* (1980) as abstracted in *Chem. Abstracts* 96:94471m, (1982).

*Primary Examiner*—Edward A. Miller
*Attorney, Agent, or Firm*—Browdy and Neimark

[57] ABSTRACT

A process is, herein, disclosed for separating a particular isotope from a mixture of different isotopes by selective excitation and ionization of the particular isotope with a single laser beam, said process comprising heating the mixture, converting the resulting atomic vapor to a highly directional atomic beam by suitable means, causing said atomic beam to travel through a vacuum, crossing the atomic beam with a high-intensity laser beam having a specific wavelength, selectively exciting the particular isotope with a first photon having that specific wavelength while the other isotopes remaining in the ground state, allowing the excited isotope to absorb a second photon to be excited to a virtual energy level, causing the so excited isotope to absorb a third photon to ionize said isotope, and recovering the ionized isotope by use of an electric or electromagnetic field.

1 Claim, 14 Drawing Figures

Fig. 4 SCHEMATIC DIAGRAM OF EXPERIMENTAL SET-UP

SCHEMATIC DIAGRAM OF VACUUM CHAMBER

Fig. 6 LINEWIDTH OF OSCILLATOR, PRE-AMPLIFIER, AND POST-AMPLIFIER CONFIGURATION DYE LASER
Fig. 7 MASS SPECTRUM OF U AND $UO_2$
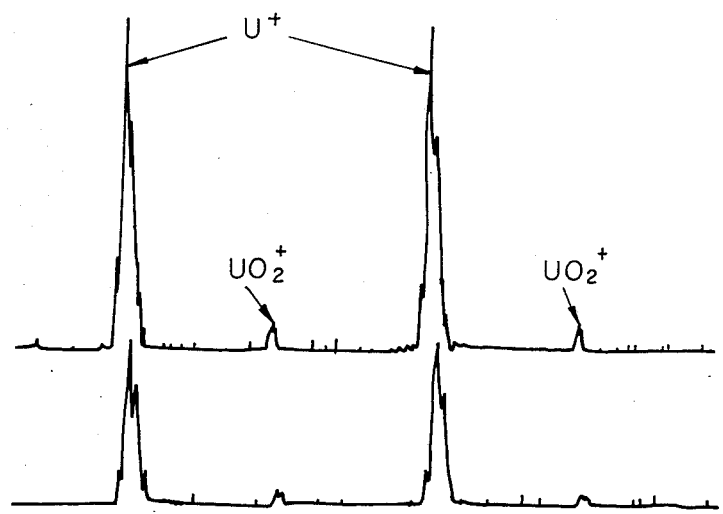

ENERGY LEVEL DIAGRAM FOR THREE-PHOTON PHOTOIONIZATION

Fig. 9 PHOTOION CURRENT AS A FUNCTION OF DYE LASER FREQUENCY

Fig. 10 ION CURRENT AND ENRICHMENT AS A FUNCTION OF DYE LASER FREQUENCY

PHOTOION CURRENT AS A FUNCTION OF DYE LASER FREQUENCY WITH HIGH INTENSITY

ION CURRENT AND ENRICHMENT AS A FUNCTION OF DYE LASER FREQUENCY

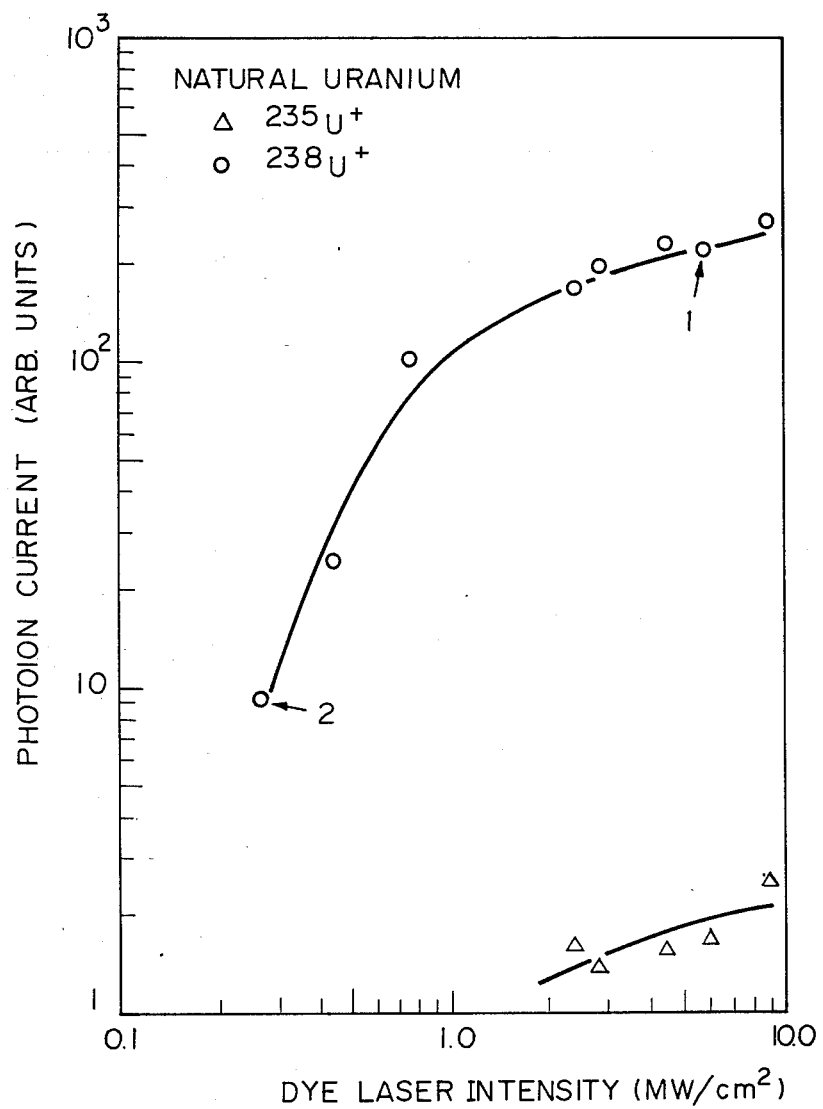
Fig. 13 DEPENDENCE OF THE PHOTOION CURRENT ON THE LASER INTENSITY

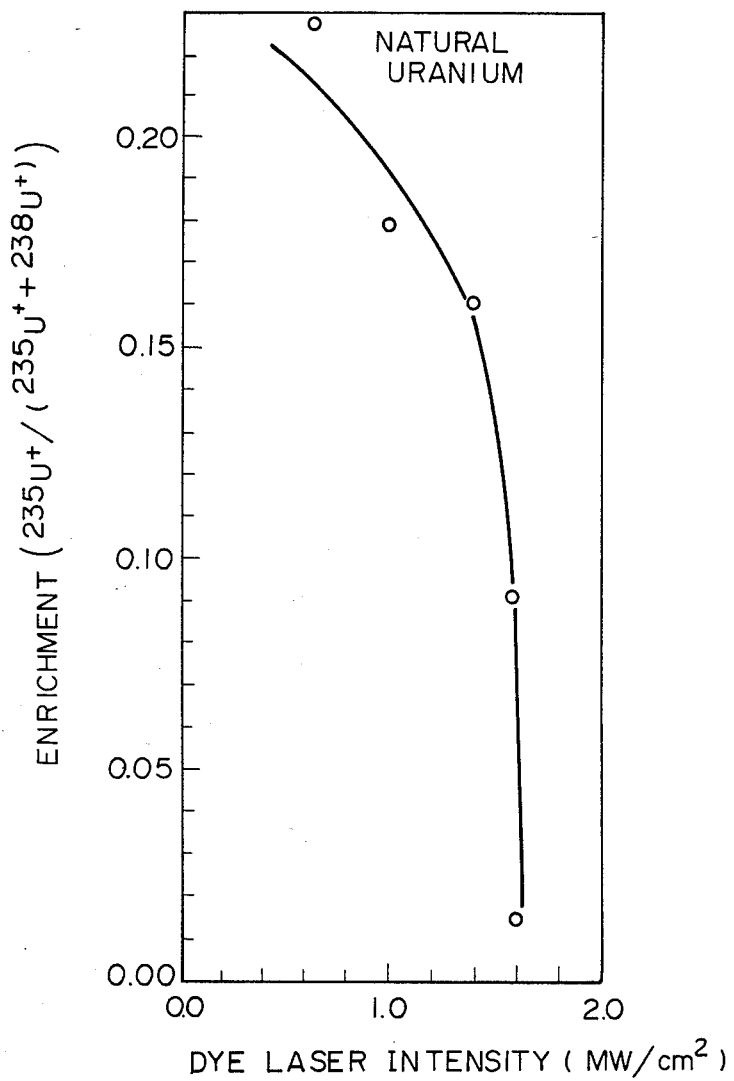
Fig. 14 DEPENDENCE OF THE ENRICHMENT ON THE DYE LASER INTENSITY

PROCESS FOR SEPARATING AN ISOTOPE FROM A MIXTURE OF DIFFERENT ISOTOPES BY USING A SINGLE LASER BEAM

BACKGROUND OF THE INVENTION

1. Field of the Invention

This invention relates to a process for separating an isotope from a mixture of different isotopes by using a single laser beam.

2. Description of the Prior Art

Various processes for isotope separation are known, and several of these find commercial application. The best known processes are based on diffusion and are mainly used to separate uranium isotopes. However, these processes expend a great deal of energy, and only a few such plants exist. Another process is based on the use of centrifuges. This route seems industrially practicable, but the plant is mechanically extremely complicated. It is also known how to separate a gas flow of gaseous uranium hexafluoride by means of special nozzles, whereby the heavier isotopes are separated from the lighter ones.

The growing importance of the nuclear industry requires easy availability of separated or enriched isotopes, especially of uranium and also of hydrogen. A wide variety of isotopes is also needed in the area of scientific and biological research, for example isotopes of hydrogen, carbon, iron, and other elements. There exists, therefore, the need for a simple and easily executed procedure to separate isotopes. This procedure should be applicable to yield small as well as large quantities of separated isotopes.

During and after World War II, the development of photochemical processes for isotope separation was attempted. This did not succeed because suitable light sources were lacking.

More recently, consideration has been given to separating isotopes by using laser light, especially after the development of dye lasers made tunable laser light available. Nevertheless, no process has been brought to production maturity, because yields were quite small, so that economic and competitive execution was not possible.

In the conventional method for isotope separation by using laser beam, two or three photons with respectively different frequencies are used. In the two-step photoionization method using two photons with different frequencies, a first photon has a frequency for selectively exciting a particular isotope and a second photon has a frequency in the near ultraviolet or the ultraviolet region because the photon ionizes the excited isotope. That is to say, an excitation laser and an ionization laser are required. And moreover, since the ionization cross-section of an atom is smaller than that of an excitation cross-section by $10^{-3}$–$10^{-4}$, the intensity of the ionization laser beam must be larger than that of the excitation laser beam by $10^3$–$10^4$. In the three-step photoionization method using three photons with different frequencies, a first photon has a frequency for selectively exciting a particular isotope, a second photon has a frequency necessary for further exciting the excited isotope to a higher excited state and a third photon has a frequency necessary for ionizing the isotope excited in the higher state. Therefore, when the conventional methods are applied for uranium separation, three visible laser beams are required. And the constitution of the visible laser pumping light source and the control apparatus become extremely complex.

For the reasons stated above, the effective and simplified process for separating a particular isotope from a mixture of different isotopes wherein selective excitation and ionization of the particular isotope are made by a single laser beam.

SUMMARY OF THE INVENTION

One of the most important objects of this invention is to provide a simplified and effective process for separating a particular isotope from a mixture of different isotopes wherein the selective electronic excitation and ionization of the particular isotope are made by a single laser beam.

These and other objects, as well as the advantages of this invention, will be apparent by reading the following description taken in conjunction with the accompanying drawings.

BRIEF DESCRIPTION OF THE DRAWINGS

FIG. 6 is a graphic representation of the linewidth of the oscillator, pre-amplifier and post-amplifier configuration dye laser.

FIG. 7 is a chart showing mass spectrum of U of $UO_2$.

FIG. 13 is a graphic representation of dependence of the photoion current on the dye laser intensity, and FIG. 14 is a graphic representation of dependence of the enrichment on the dye laser intensity.

DETAILED DESCRIPTION OF THE INVENTION

This invention relates to a process for separating a particular isotope from a mixture of different isotopes. More particularly, this invention relates to a process for separating a particular isotope from a mixture of different isotopes by selective excitation and ionization of the particular isotope with a single laser beam.

The term "three-photon photoionization" used by this invention means that the selective excitation and the ionization of the particular isotope to be separated are effected by the absorption of three photons having same frequencies respectively by using a single laser beam.

The three-photon photoionization method according to this invention, though intensity of the excitation laser beam is higher than those of the excitation laser beams in the two-step and the three-step photoionization method, does not require a powerful ionization laser.

Because, according to this invention, the selective excitation and the ionization are made with a single laser beam, the system can be simplified advantageously in practical operation as compared to the cases of other photoionization methods.

Figure 1:
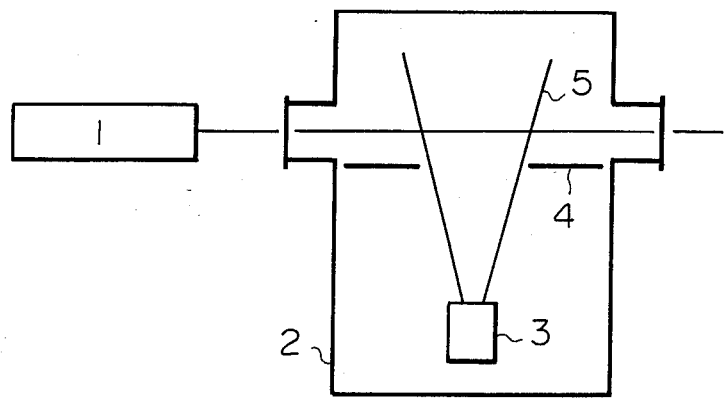
FIG. 1 is a schematic diagram of the apparatus as an embodiment of this invention.

The constitution according to this invention will be described with reference to FIG. 1 which illustrates an apparatus as an embodiment of this invention. In the figure, a metallic element containing a particular isotope, placed in a metal melting crucible (3) which is set within a vacuum chamber (2), is melted in the crucible (3) by resistance heating or electron bombardment heating and so it becomes an atomic vapor. The atomic vapor then through a collimator (4) becomes a highly directional atomic vapor beam (5). The atomic beam is then irradiated above the collimator (4) with a laser beam generated by laser (1). In the irradiation section there are provided electrode plates for applying an electric field and a magnet for applying a magnetic field. Consequently, the ions produced by the absorption of three photons are recovered on the electrode plate.

An essential constitution of the method according to this invention is as described above. The method will be described in further detail.

Figure 2:
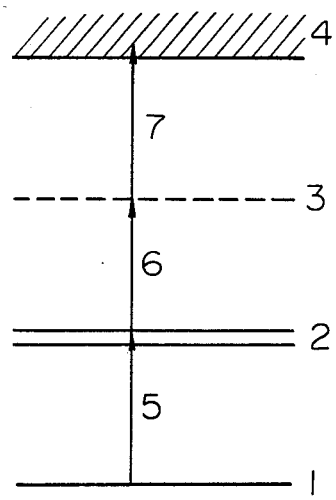
FIG. 2 is a conceptual diagram of the energy levels of an element according to this invention. In the diagram, 1 is the ground state, 2 is a selective excitation level, 3 is an virtual level, 4 is the ionization potential, and 5, 6 and 7 are photons of same frequency.

According to this invention, a mixture containing a particular isotope is melted and vaporized by means of electron heating or resistance heating. The produced atomic vapor through a collimator becomes a highly directional atomic beam. In the case where the particular isotope is $235_U$ and so slightly enriched uranium (1-3%) is to be produced, the Doppler broadening may be about 10 GHz and the laser line width may be about 1 GHz. There is no need for etalon of high reflectivity to narrow a laser line width and so efficiency of the laser can be high. The atomic beam, which has entered the reaction section with a laser beam, crosses this laser beam of high intensity. A wavelength of the laser beam is one of the group of 5027 Å, 5511 Å, 5620 Å, 5758 Å, 5915 Å and 5971 Å. The particular isotope is excited selectively with a first photon of this wavelength (2 in FIG. 2); the components other than this isotope remain in the ground state (1 in FIG. 2). In this case, by shifting the frequency of the laser beam from the resonance level of the particular isotope by 1-2 GHz, the adjustment in enrichment is possible; that is, concentration of the product can be adjusted within about 1-5%. This invention utilizes a power broadening, however, a laser beam of high intensity than is required causes an excessive wider broadening of the excitation level, making impossible the selective excitation. The particular isotope which has been excited selectively by the absorption of the first photon absorbs a second photon and so it is excited to a virtual energy level (3 in FIG. 2). This energy level is not existent actually. This invention utilizes a virtual energy level as stated above, but a higher efficiencies of the excitation and the ionization can not be obtained. However, the efficiencies of the excitation and the ionization can be improved if the existing energy level is in the vicinity of the virtual energy level. Especially, this phenomenon is remarkably present by using a proper power broadening. The closer to an existing energy level the virtual level is, the lower becomes the energy of a laser beam necessary for the excitation and the ionization, leading to a higher efficiency of the laser utilization. The particular isotope which has been excited to the virtual energy level absorbs another (third) photon. The sum total of the energies of the three photons is so set to be larger than the ionization potential of the element (4 in FIG. 2), so that the particular isotope now becomes an ion. Since this ion possesses a positive charge, these ions are recovered by means of an electric field and/or an electromagnetic field.

In the method of isotope separation according to this invention, which utilizes the absorption of three photons, the frequency of the laser beam is one selected from the group of 5027 Å, 5511 Å, 5758 Å, 5915 Å and 5971 Å.

For the excitation light source according to this invention is preferably employed a system, high in pulse repetition rate and in peak output, of either flash lamp pumped dye laser, copper vapor pumped dye laser or Nd:YAG pumped dye laser and excimer pumped dye laser.

Figure 3:
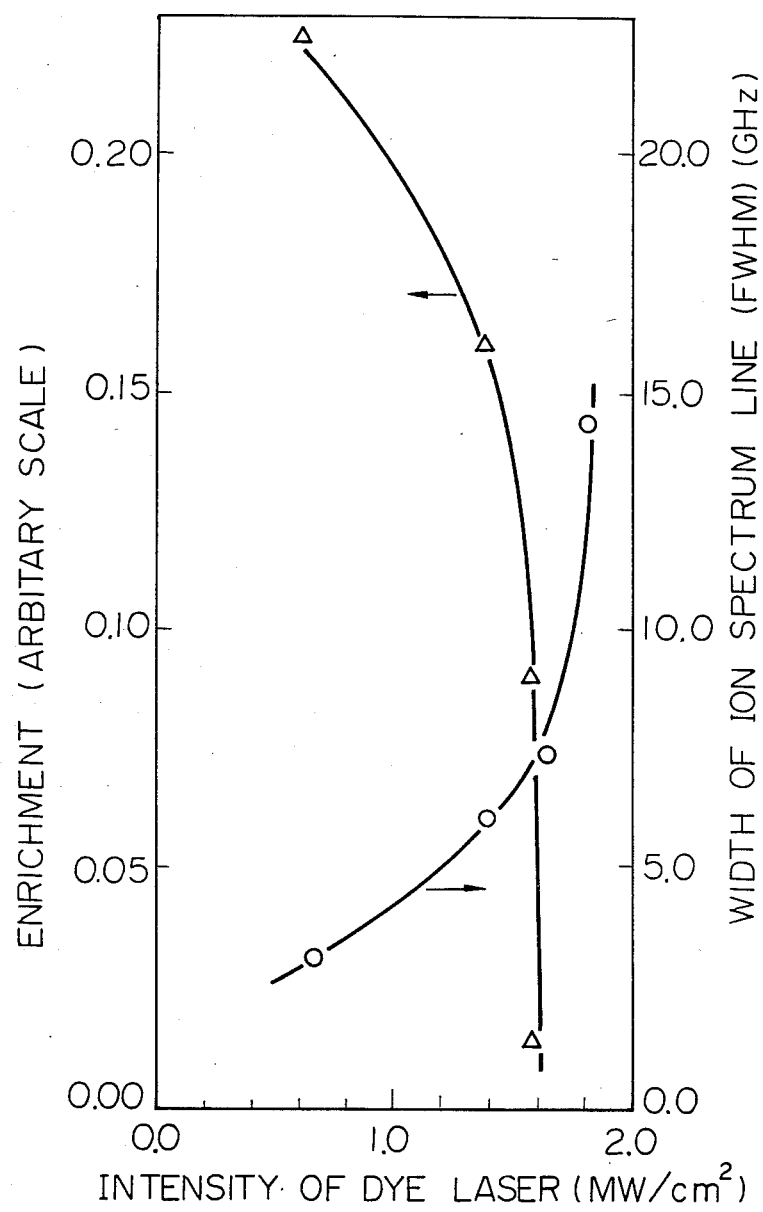
FIG. 3 is a graphic representation of the results obtained in an embodiment of this invention.

The results obtained by this invention are shown in FIG. 3.

FIG. 3 illustrates the relationship between the dye laser beam intensity on one hand, and the enrichment and the spectrum width on the other. It is seen that with the increase of the dye laser beam intensity, the spectrum width increases and the concentration of the product decreases. It is thus implied that by changing the dye laser beam intensity the concentration of the product can be changed.

The constitution and the effect according to this invention will then be explained concretely by the Example. In the Example the isotope separation of uranium was carried out.

EXAMPLE

Figure 4:
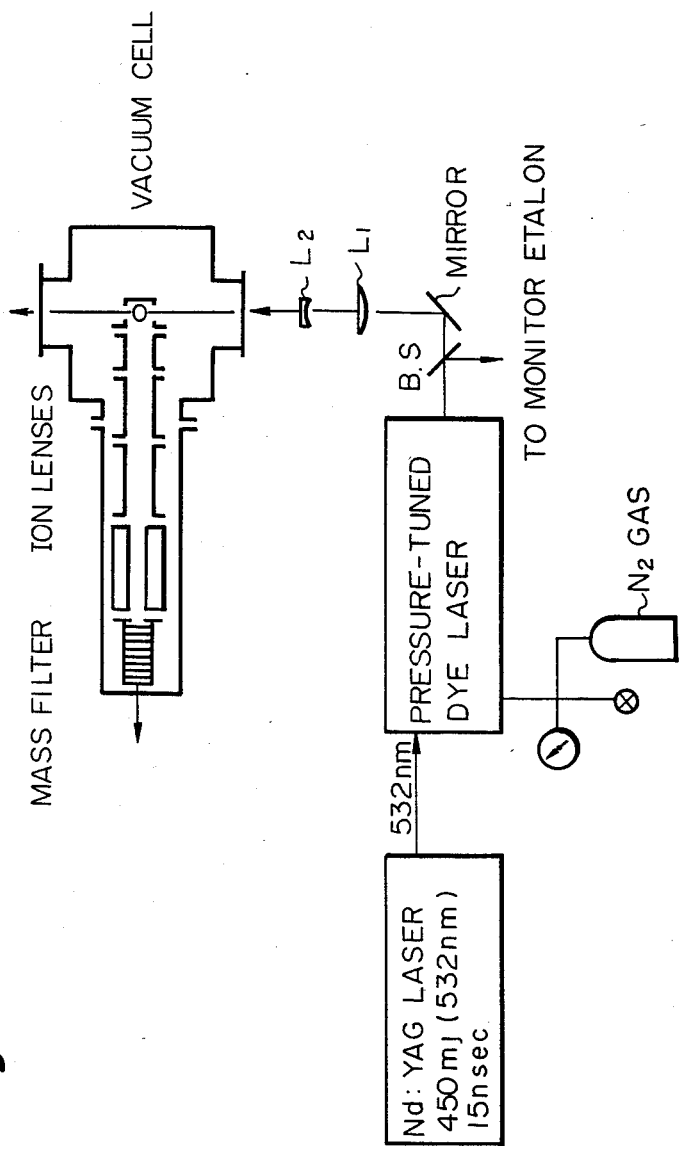
FIG. 4 is a schematic diagram of the apparatus used in the Example.
Figure 5:
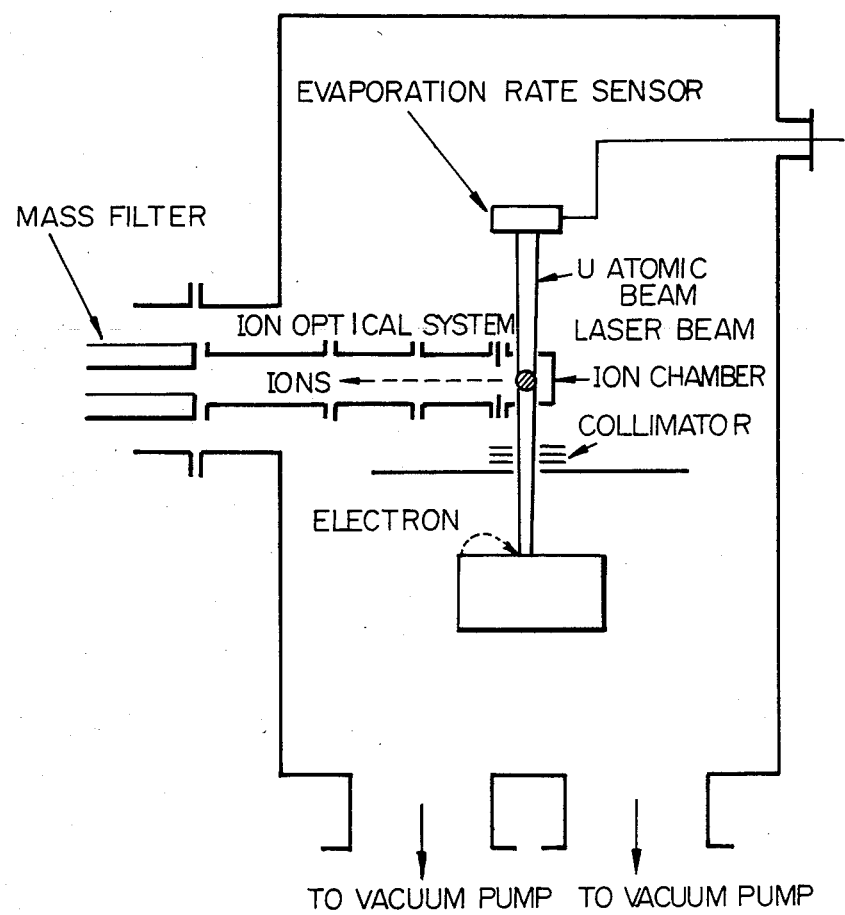
FIG. 5 is a schematic diagram of vacuum chamber used in the Example.

Apparatus used:

FIG. 4 shows a schematic diagram of an experimental apparatus used for the experiment of a three-photon ionization, and FIG. 5 shows a schematic diagram of a vacuum chamber. As illustrated in the figure, the experimental apparatus consists broadly of a laser as a light source for excitation and ionization, and a vacuum chamber for the reaction of uranium atoms and a laser beam. A dye laser for the excitation and the ionization of uranium atoms is pumped with the second harmonic of a fundamental frequency generated a Nd:YAG laser (Molectron ® "MY-35"). The dye laser (Molectron ® "DL-18P") is pressure-sweeping type; it consists of an oscillator and an amplifier. The linewidth is about 1 GHz, when an etalon with FSR30 and a finesse 30 are used and a linewidth at wavelength 591.5 nm is as shown in FIG. 6. The linewidth is thus about 1 GHz (FWHM), and it is seen that the selective excitation is possible with an energy of 16900 $cm^{-1}$ having an isotope shift of about 5 GHz. The dye laser has an energy conversion efficiency of 20-30% and so an output on the order of MW is easily obtainable. The tuning in the wavelength is made by changing the pressure within the vessel where there are set a grating and Etalon (from 0 to 1 atmosphere). The gas used in this case is a nitrogen gas having a refractive index of 1.000299 (590 nm); the sweeping width is about 0.17 nm.

The vacuum cell is a reaction cell for the reaction of a laser beam and uranium atoms. It is comprised of a cell vessel, a vacuum evacuation system, an electron gun, a water-cooled hearth, a collimator, a quadrupole mass spectrometer, a film thickness gauge, etc. In the vacuum evacuation system, two diffusion pumps each of capacity 1500 l/sec are used in parallel. In experiments, a pressure of $1 \times 10^{-7}$ torr or lower can be maintained. The melting of uranium metal is made in a water-cooled hearth made of copper. The metal is melted and vaporized by means of the electrons of 8 KV and 1 A from the electron gun. The collimator collimates the atomic vapor, suppressing the Doppler broadening and the impact spreading and consists of four plates, each having an opening of 5 mm × 10 mm. At the time of heating the uranium metal, the temperature of the metal rises to over 2000° C. so that there is formed a considerable quantity of thermal-ionization ions. And moreover, there also exist stray electrons from the electron gun. Therefore, to remove these ions and electrons, positive voltage and negative voltage are applied to the respective collimators.

The quadrupole mass spectrometer (ULVAC Corporation's MSQ 300) includes an ion chamber, an ion optical system and a mass spectrometer. The ion chamber is a reaction section for the reaction of a laser beam and uranium atoms. On the lower side and on the upper side of the ion chamber a hole with a diameter of 5 mm is made for the passage of an atomic beam. And, at right angles with the direction of the atomic beam, two holes with a diameter of 5 mm are also made for the passage of an ion beam. Within the ion chamber there is set a filament, whereby analysis is made of a composition of the atomic beam and the residual gas in the cell. The ions produced in the ion chamber are deflected perpendicularly to the atomic beam by means of an electrostatic field. The ions are then led, through an aperture with a diameter of 5 mm, into an ion lens system. The ion lens system is a three-step electrostatic lens; each step of the lens is individually controllable. After passing through the electrostatic lens, the ions enter a quadrupole mass spectrometer for analysis. In FIG. 7 is shown a mass spectrum of uranium atoms in the atomic beam by an electron bombardment measured prior to the experiment of photoionization. Since the surface of the specimen of uranium does not undergo heat-treatment, there is observed a peak of the uranium oxide in addition to those of $^{235}U$ and $^{238}U$. From the spectrum, it is confirmed that the specimen is natural uranium (0.7% uranium-235).

Above the ion chamber there is a crystal type of film thickness gauge whereby the flux of an atomic beam is measured continuously. The laser beam inlet window is made from BK-7. The surface on either side of the window is coated with non-reflecting multi-layer film; the transmissivity is over 99% at wavelength 591 nm.

Figure 8:
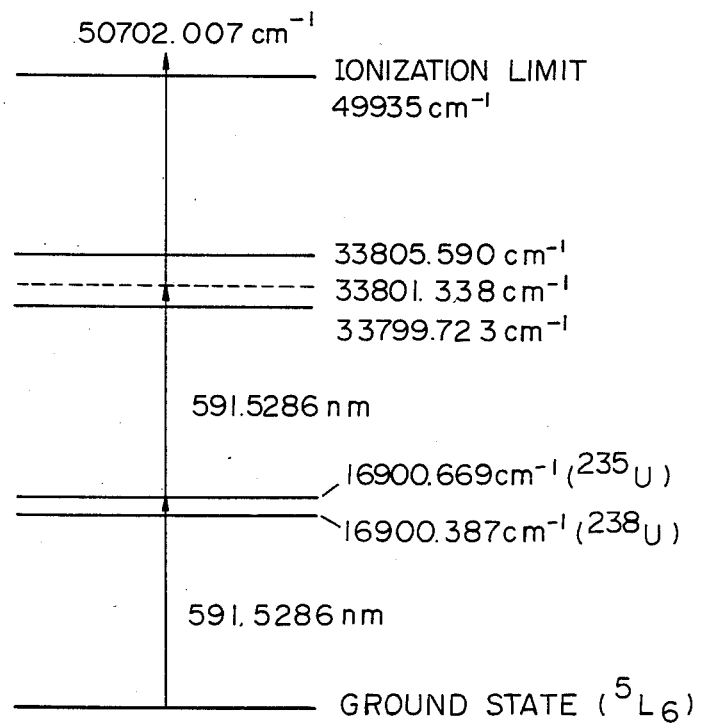
FIG. 8 is a energy level diagram for three-photon photoionization.

In FIG. 8 is shown a schematic diagram of the energy levels employed in the experiment. In the experiment, for the selective excitation level, an energy level of 591.5286 nm (16,900.699 cm$^{-1}$) was chosen. In this energy level, as already reported in the literature, the isotope shift is about 5 GHz, the $^{235}U$ spectrum broadening is about 8 GHz, and the absorption cross-section is about $1 \times 10^{-13}$ cm$^2$. An atom selectively excited to this level absorbs a photon of the same wavelength as the first photon, and so the atom is excited to an imaginary level of 33,801.338 cm$^{-1}$. The photon then absorbs another photon of the same energy and it finally possesses an energy larger than the ionization potential (49,935 cm$^{-1}$) by 760 cm$^{-1}$. The atom thus becomes an ion.

Results obtained

Figure 9:
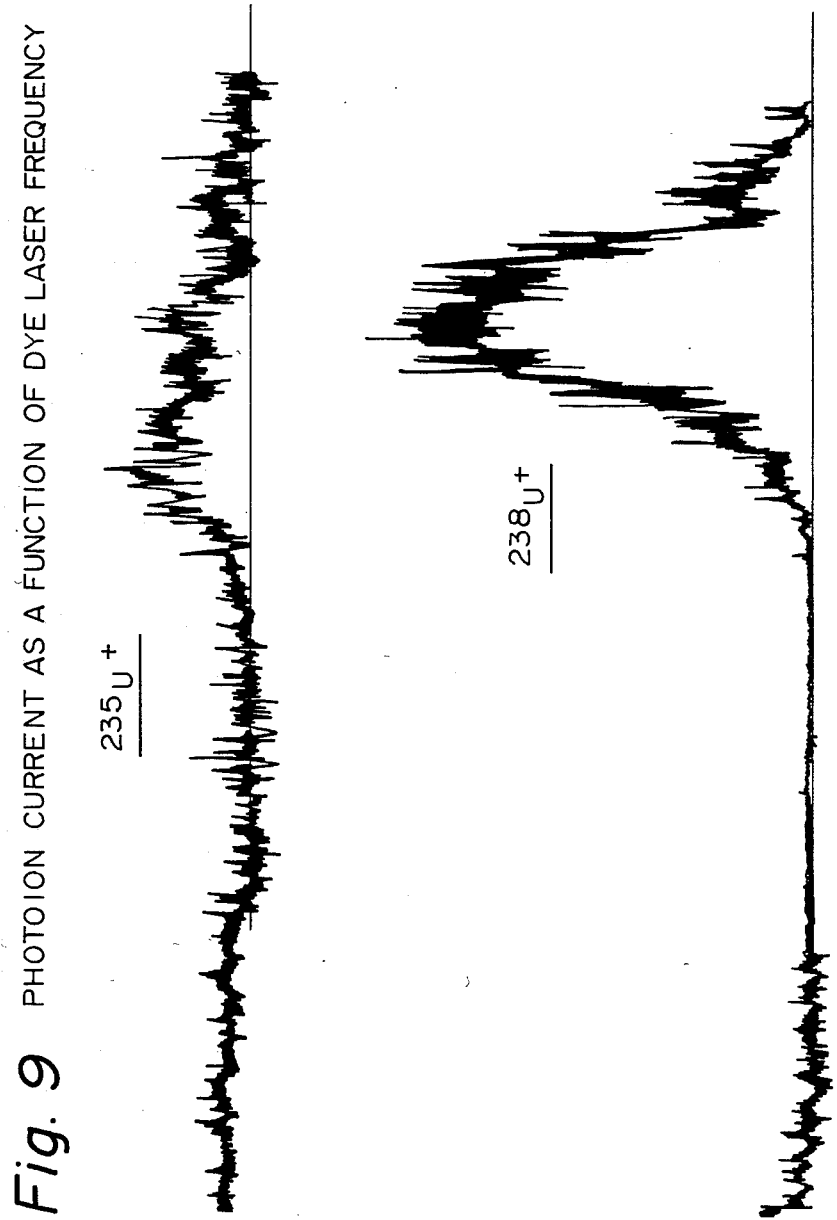
FIG. 9 is a chart showing photoion current as a function of dye laser frequency.

In FIG. 9 is indicated the dependency of the $^{235}U$ and $^{238}U$ ion spectrum on wavelengths of the dye laser beam. The fine oscillations in the figure are the results of oscillation of the ion currents caused by pulsed laser. In the figure, it is seen that along with the sweeping of the dye laser beam wavelengths, both $^{235}U$ and $^{238}U$ are selectively excited and ionized. The separation in peaks of $^{235}U$ and $^{238}U$ is 7.4 GHz. In the figure, the ion current of $^{235}U$ appears to rise again at the position of a peak of $^{238}U$. This is possibly due to the charge exchange between $^{235}U$ and $^{238}U$ $$^{235}U + {}^{238}U^+ \rightarrow {}^{235}U^+ + {}^{238}U$$

or to a broadening of the $^{238}U$ spectrum.

Figure 10:
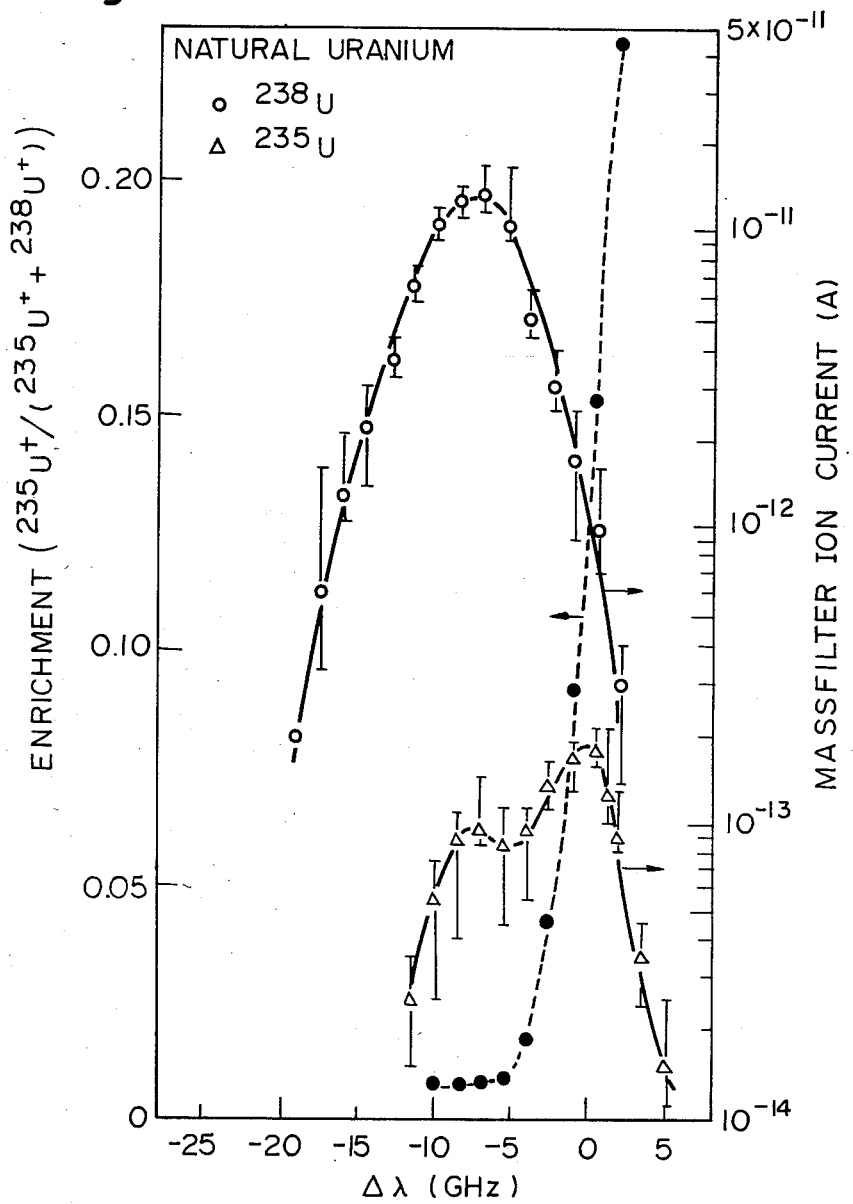
FIG. 10 is a graphic representation of ion current and enrichment as a function of dye laser frequency.
Figure 11:
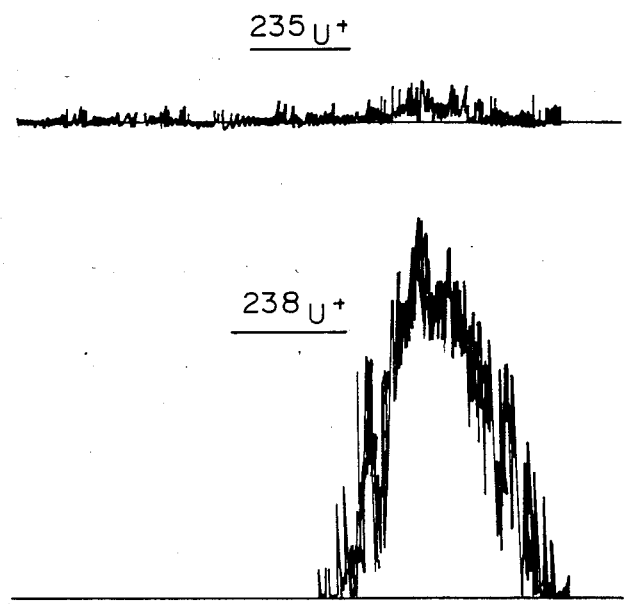
FIG. 11 is a chart showing photoion current as a function of dye laser frequency with high intensity.
Figure 12:
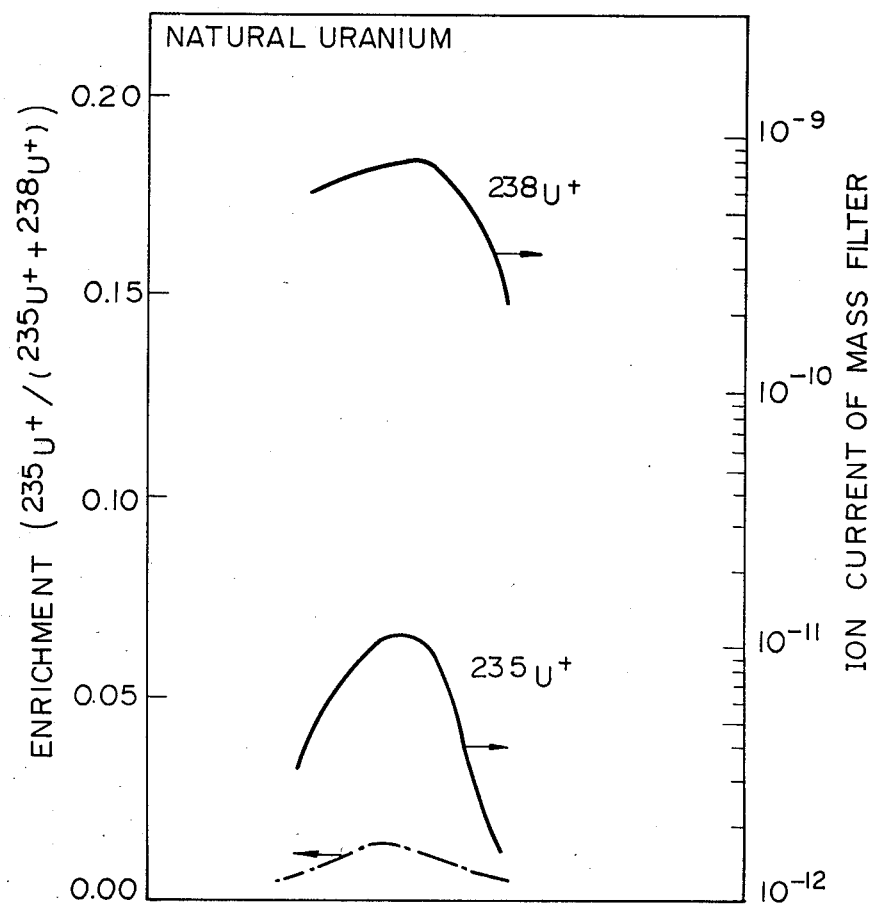
FIG. 12 is a graphic representation of ion current and enrichment as a function of dye laser frequency.

In FIG. 10 is shown the relation between the enrichment and the ion currents by mass analysis on one hand, and the frequency of the dye laser beam on the other. It is seen that in the experiment, natural uranium is enriched to about 22%. In FIG. 11 is shown the ion spectrum in the case of dye laser beam intensity 1.6 MM/cm$^2$. As indicated in the figure, the spectra extend over 10 GHz; the position of a peak of $^{235}U$ and of $^{238}U$ are not distinct. FIG. 12 shows the relation, from FIG. 11, between the enrichment and the ion currents on one hand, and the frequency of the laser beam on the other. The width of $^{238}U$ extends over the range of 10 GHz, and it appears that the width of $^{235}U$ is contained in this range. Consequently, the enrichment is considerably low, 1.5%, as compared in the case of weaker intensity of the laser beam.

In FIG. 13 is indicated the dependency of the ion currents on intensity of the dye laser beam. In the figure, it is shown that at intensities lower than 300 KW/cm$^2$, the photoionization ions are not observed at all; the threshold is at about 300 KW/cm$^2$. Then, beyond the level of dye laser beam intensity 5 MW/cm$^2$, the ion currents begin to be saturated. It is important in this case to note that at such high intensities, because of the power broadening, the selective excitation becomes impossible.

In FIG. 14 is indicated the relation between the enrichment and intensity of the dye laser beam. It is seen in the figure that the enrichment drops off sharply in the vicinity of dye laser beam intensity 1.6 MW/cm$^2$. This is because, due to the power broadening, $^{235}U$ and $^{238}U$ are excited and ionized at the same time.

Taking the three-photon photoionization as one-step phenomenon, the ionization cross-section will be roughly estimated.

The probability of ionization of the $N_g$ number of atoms by Ie photons in absorption is expressed as $$N_i = N_g \cdot (1 - \exp < -\sigma \cdot Ie)$$

with sufficiently large value of Ie, that is, at the point of ionization saturation, possibly $$\exp(-\sigma \cdot Ie) < < 1.$$

Accordingly, at     in FIG. 13

$$N_i = f \cdot N_g$$

At small value of Ie, can be rewritten as $$\exp(-\sigma \cdot Ie) \sim 1 - \sigma \cdot Ie.$$

Accordingly, at     in FIG. 13
$$N_i = f \cdot N_g \cdot \sigma \cdot Ie$$

Because $N_g = N_g$ $$\sigma = N_i \ 2 \ /N_i \ 1 /Ie \ 2$$

In the figure, $N_i \ 2 \ /N_i \ 1 \simeq 0.0409$, and so $\sigma \sim 0.0409/1.9 \times 10^{14} \simeq 3.7 \times 10^{-16}$ cm$^2$ is obtained.

Consideration

The experiment on the isotope separation of uranium by three-photon absorption was made using a dye laser beam of high intensity. In the experiment of selective uranium isotope ($^{235}$U) excitation and ionization according to the process of this invention, a maximum of 22% enrichment could be obtained. It was shown that the minimum intensity of laser beam necessary for the ionization is large compared with that in the process utilizing resonance energy levels, and this leads to a broadening of the spectra, resulting in a decrease of the enrichment. This is also related with the yields of ions. That is, in raising the intensity of laser beam to increase the quantities of ions, the spectra become broadened so that the selective ionization is no longer possible.

What is claimed is:

1. A process for separating a particular isotope from a mixture of different isotopes of an element by selective exitation and ionization of the particular isotope with a single laser beam, said process comprising:

heating an isotopic mixture to form an atomic vapor comprising uranium-235, each of the atoms of the atomic vapor being in a ground state;

converting the resulting atomic vapor to a highly directional atomic beam by suitable means;

causing said atomic beam to travel through a vacuum, crossing the atomic beam with a single laser beam having a wavelength selected from the group consisting of approximately 5027; 5511; 5620; 5758; 5915 and 5971 angstroms and an intensity of about $3 \times 10^5$ to $10^6$ W/cm$^2$;

selectively exciting the particular isotope with a first photon from said laser beam while the other isotopes remain in the ground state;

allowing the excited isotope to absorb a second photon from said laser beam to be excited to a virtual energy level, causing the so excited isotope to absorb a third photon from said laser beam to ionize said isotope, and recovering the ionized isotope by use of an electric of electromagnetic field.

* * * * *